United States Patent [19]

Vandenbroucke

[11] Patent Number: 5,761,945
[45] Date of Patent: Jun. 9, 1998

[54] QUICK AUTOMATED TOOL CHANGER ROLL FORMING APPARATUS

[76] Inventor: Jack-Eric Vandenbroucke, 1219 Jean Vincent, Carignan, Québec, Canada, J3L 3P9

[21] Appl. No.: 633,796
[22] PCT Filed: Oct. 18, 1994
[86] PCT No.: PCT/CA94/00587
  § 371 Date: Apr. 18, 1996
  § 102(e) Date: Apr. 18, 1996
[87] PCT Pub. No.: WO95/11097
  PCT Pub. Date: Apr. 27, 1995

[30] Foreign Application Priority Data

Oct. 18, 1993 [CA] Canada ................. 2118330

[51] Int. Cl.$^6$ ................................... B21D 5/08
[52] U.S. Cl. ................ 72/176; 72/10.6; 72/181; 72/249; 72/226
[58] Field of Search ............. 72/10.2, 181, 176, 72/182, 226, 249, 10.6

[56] References Cited

U.S. PATENT DOCUMENTS

| | | | |
|---|---|---|---|
| 494,904 | 4/1893 | Story | 72/226 |
| 1,443,164 | 1/1923 | Bracken . | |
| 3,306,197 | 2/1967 | Jensen et al. . | |
| 3,318,130 | 5/1967 | Sendzimir | 72/226 |
| 3,400,657 | 9/1968 | Fulks . | |
| 3,730,080 | 5/1973 | Deligt . | |
| 4,286,451 | 9/1981 | Chang | 72/181 |
| 4,408,470 | 10/1983 | Fromont | 72/10.2 |
| 4,776,194 | 10/1988 | Chang | 72/182 |
| 4,876,837 | 10/1989 | Kelly et al. | 72/180 |
| 4,974,435 | 12/1990 | Vandenbroucke | 72/176 |
| 5,107,695 | 4/1992 | Vandenbroucke | 72/226 |
| 5,259,228 | 11/1993 | King | 72/226 |
| 5,291,108 | 3/1994 | Gerretz | 72/13.4 |

FOREIGN PATENT DOCUMENTS

| | | | |
|---|---|---|---|
| 2 475 437 | 8/1981 | France . | |
| 28 16 993 | 10/1979 | Germany . | |
| 39 33 260 | 10/1990 | Germany . | |
| 40 24 374 | 2/1992 | Germany . | |
| 166308 | 9/1984 | Japan | 72/226 |
| 1 251 000 | 10/1971 | United Kingdom . | |
| WO 91/05263 | 5/1991 | WIPO . | |

Primary Examiner—Daniel C. Crane
Attorney, Agent, or Firm—Swabey Ogilvy Renault

[57] ABSTRACT

The apparatus comprises a pair of rotatable devices each holding a plurality of metal shaping and/or cutting rollers, the rollers of one device meshing with rollers of the other device to produce specific designs or widths of material. This is made possible by merely selecting suitable rollers of both sets and when production of a specific metallic section of desired widths are terminated, other rollers are selected by rotating the rotatable devices. When suitable rollers have been selected they are locked in operating position and when another design or widths are required, the devices are unlocked, a selection is made, and the devices are again locked to produce the new metallic section or widths of material. The present quick automated tool changer, i.e. QATC, roll forming apparatus is characterized by a novel indexing device for the two forming rolls to be used in a roll forming operation; by the use of Brushless-type motors for individually driving the shafts carrying the forming rolls in use, these motors being of the constant torque type; by quick-changing supports carrying the rolls for allowing the rolls which are not in use to be changed; by sensors on the cylinders providing the force on the forming rolls for giving feedback to the operator on changes in this force; and by a pair of gears selectively engageable with the gearing mechanism linking the Brushless motors to the forming rolls in use for providing a larger range of operating speeds of the forming rolls.

11 Claims, 14 Drawing Sheets

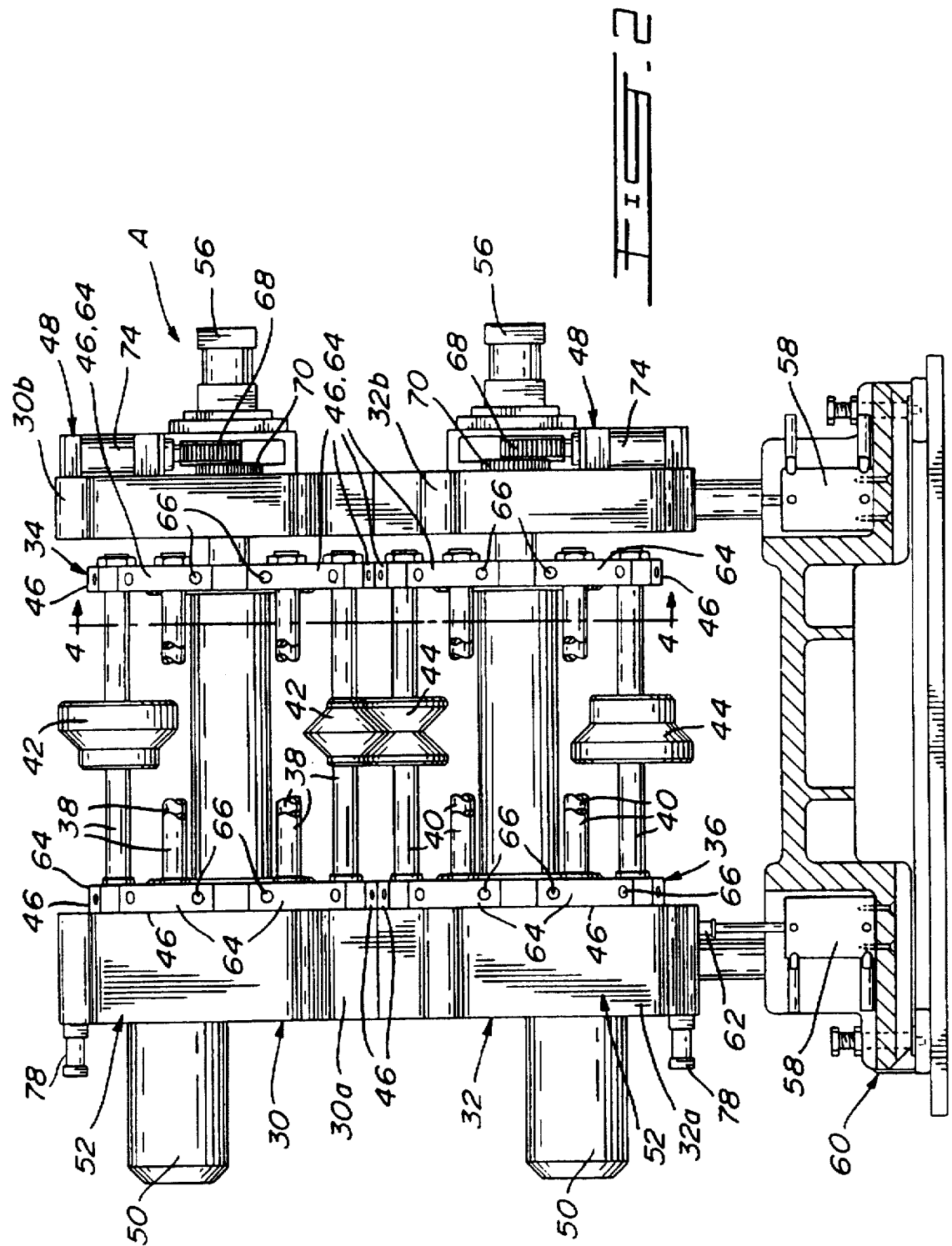

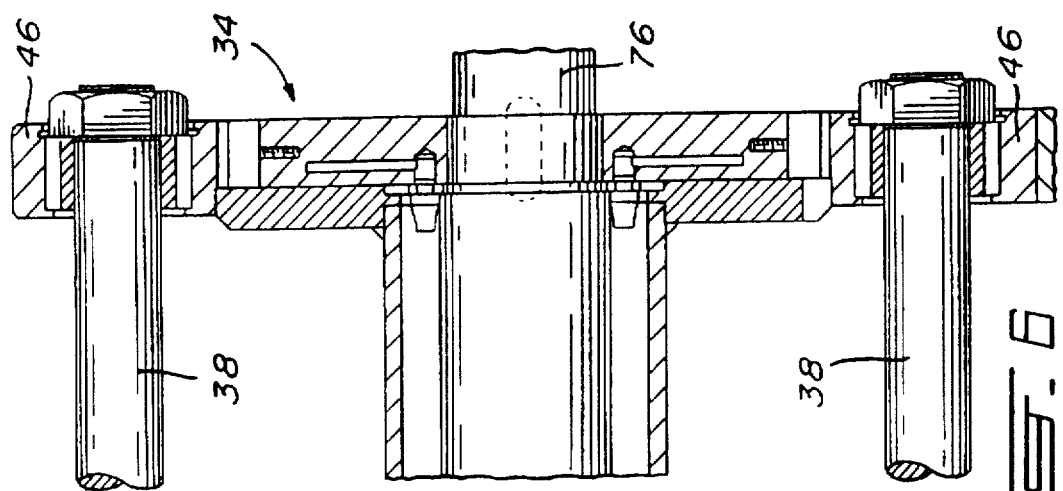
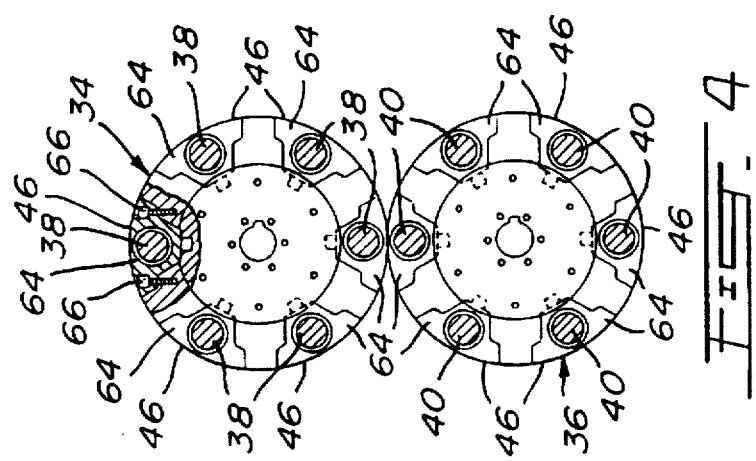
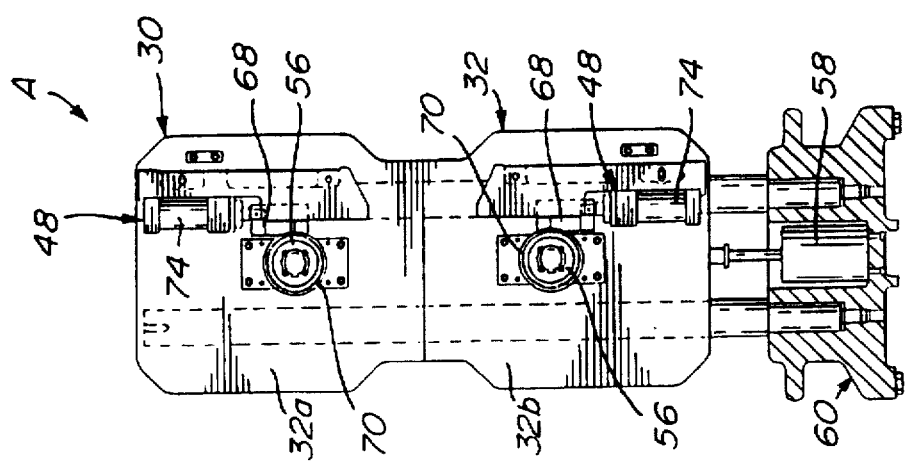

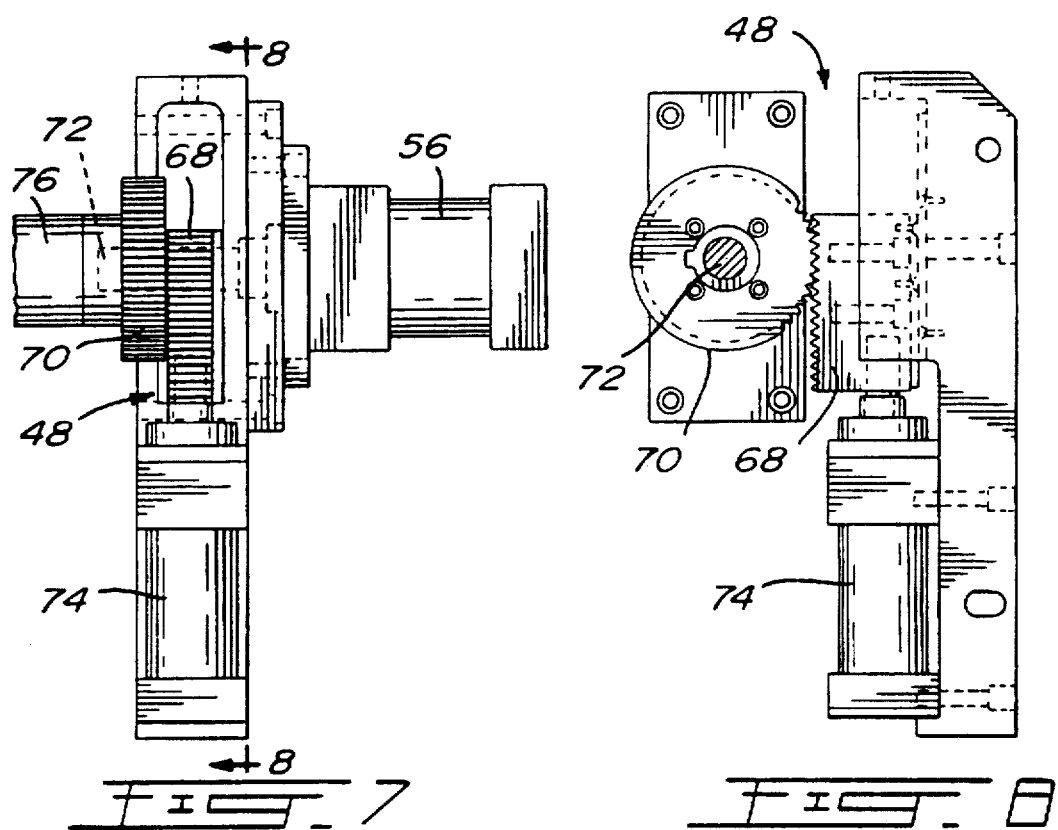
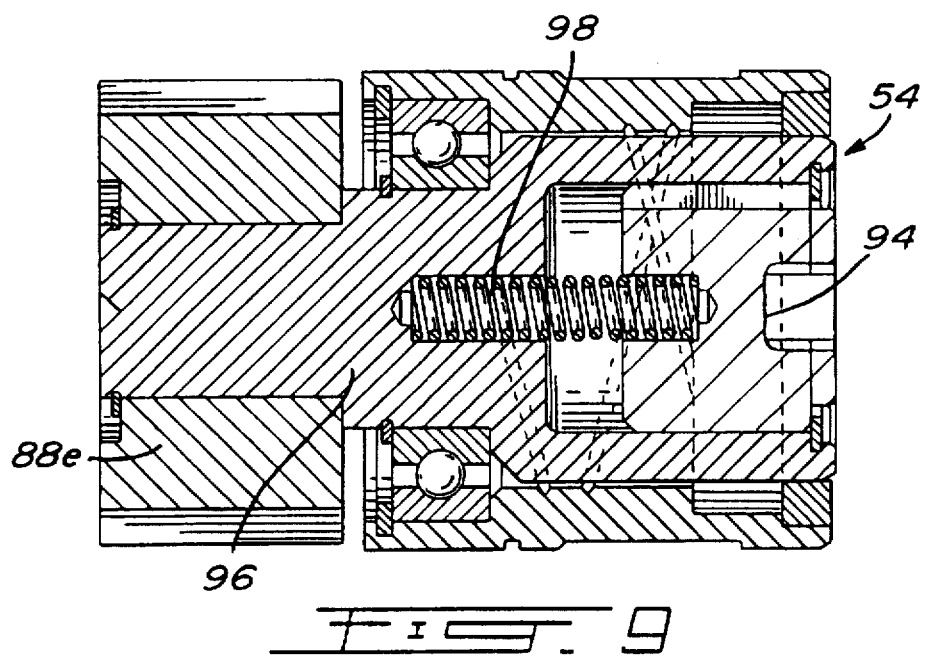

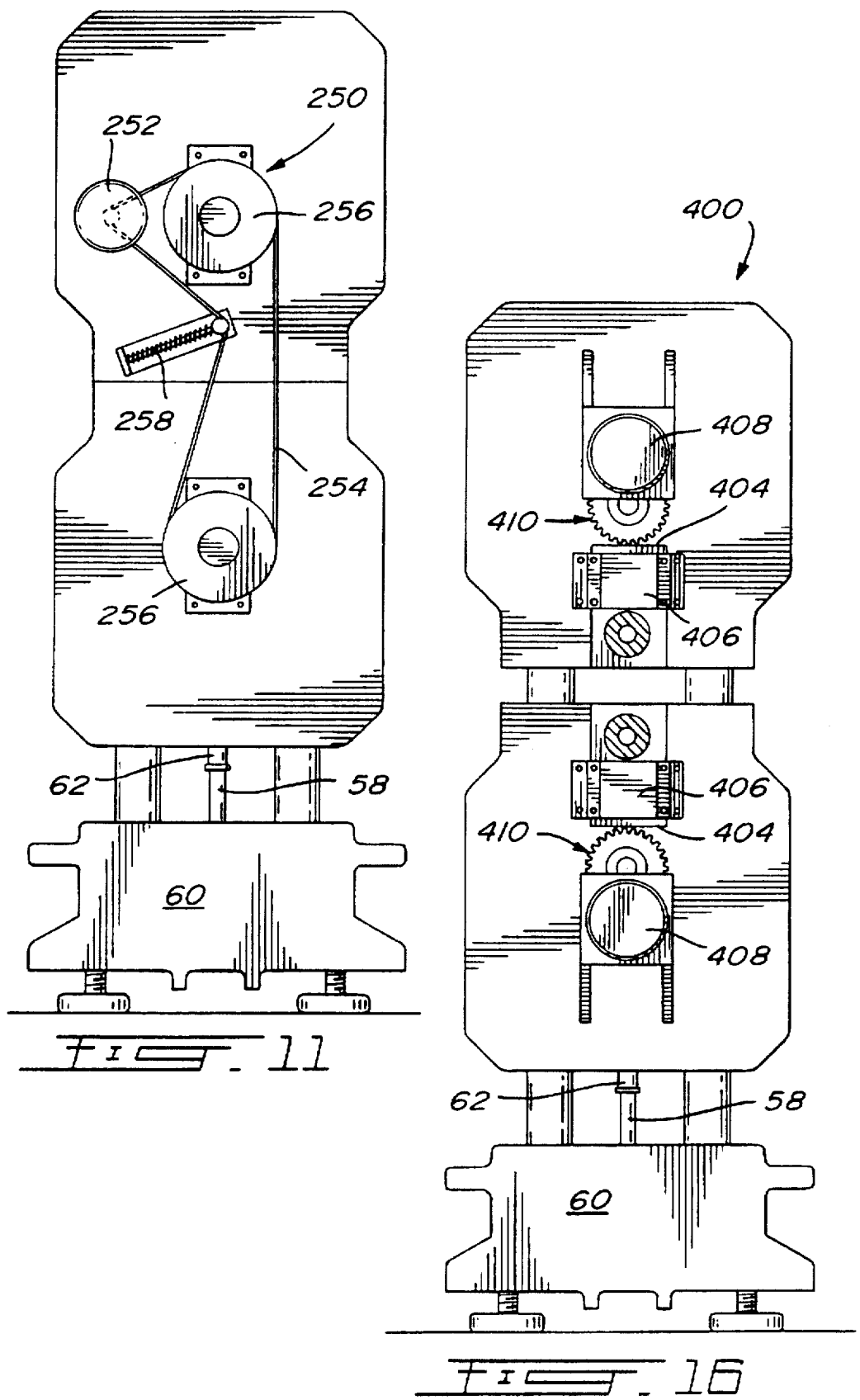

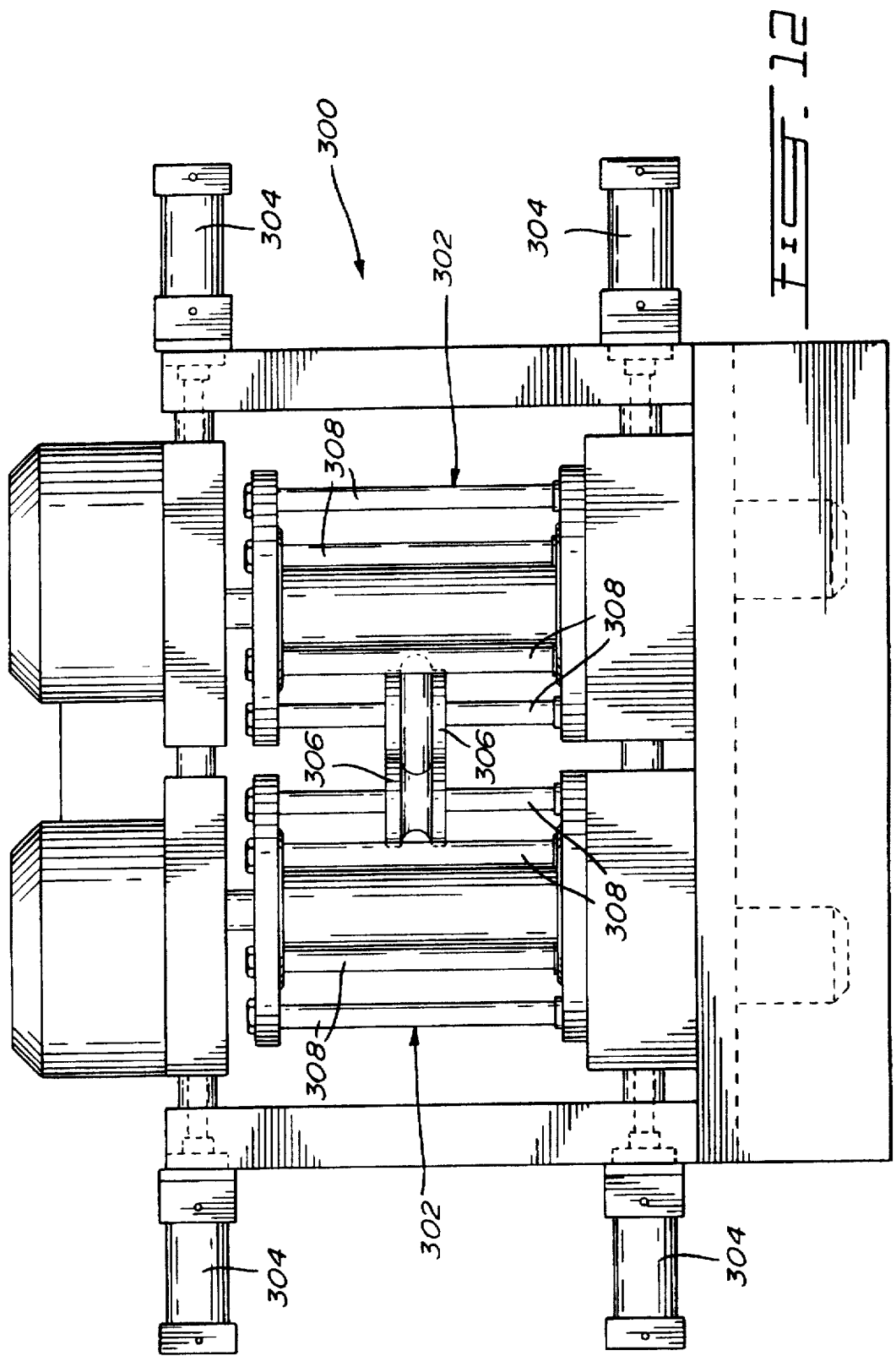

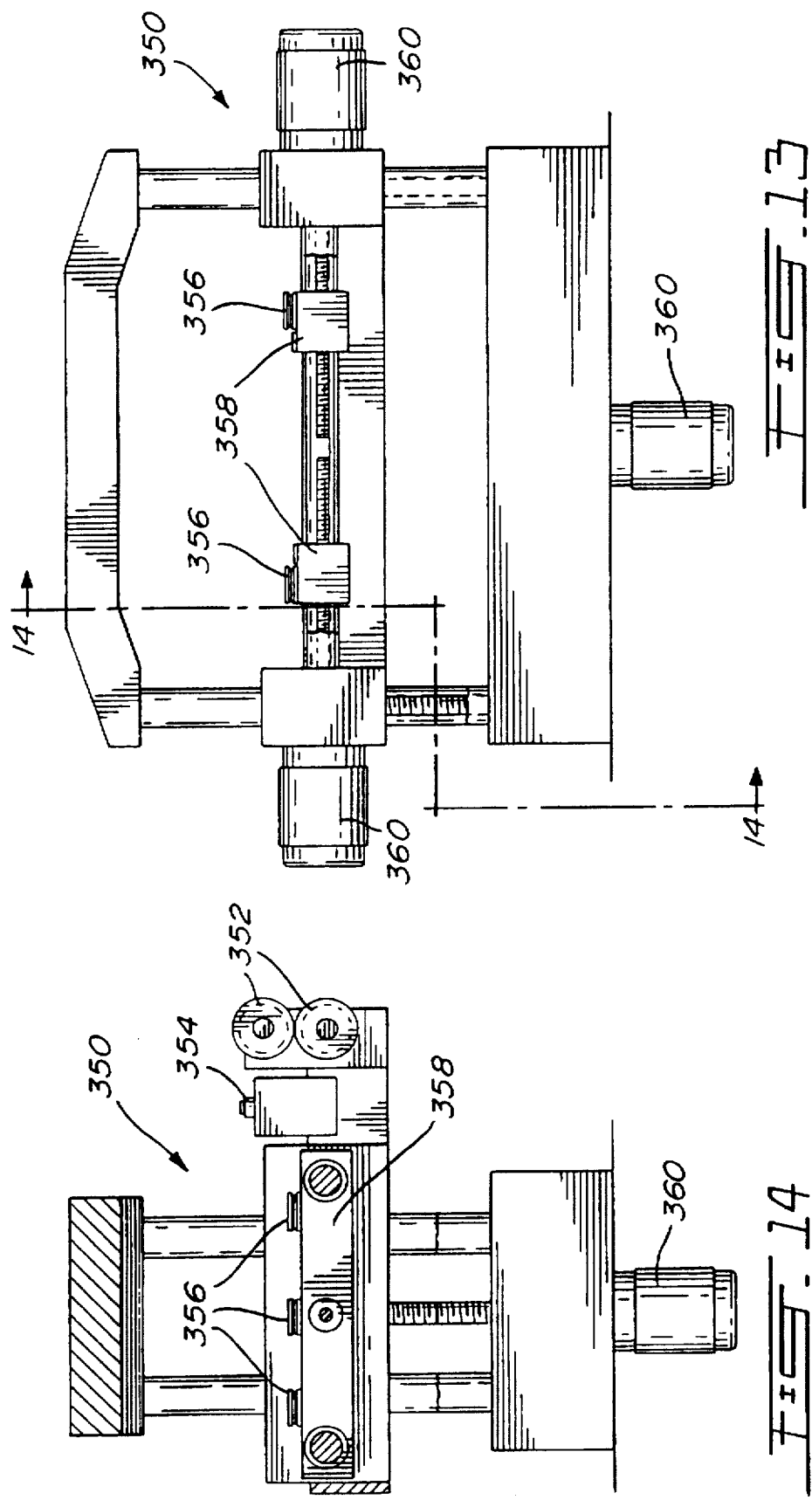

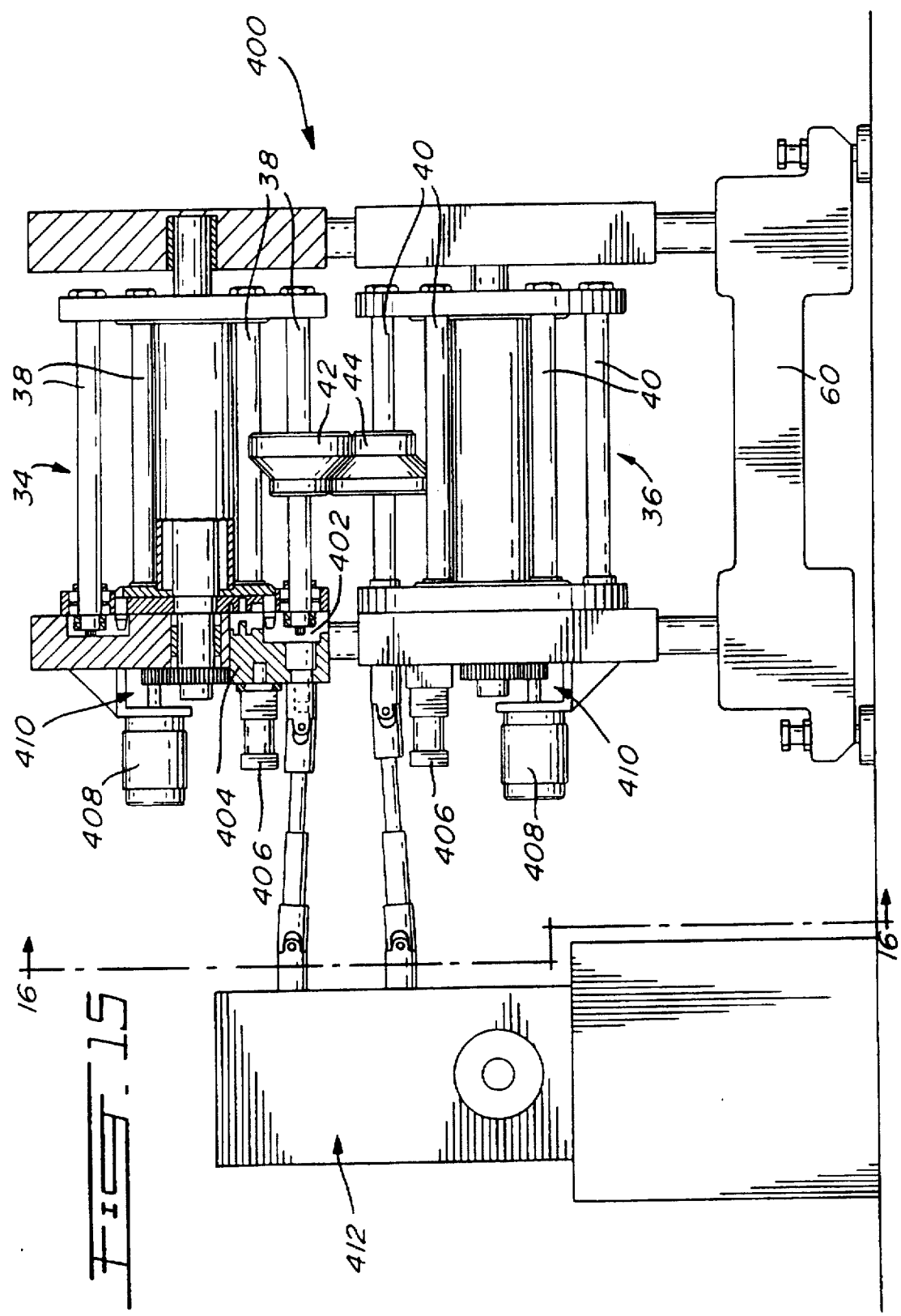

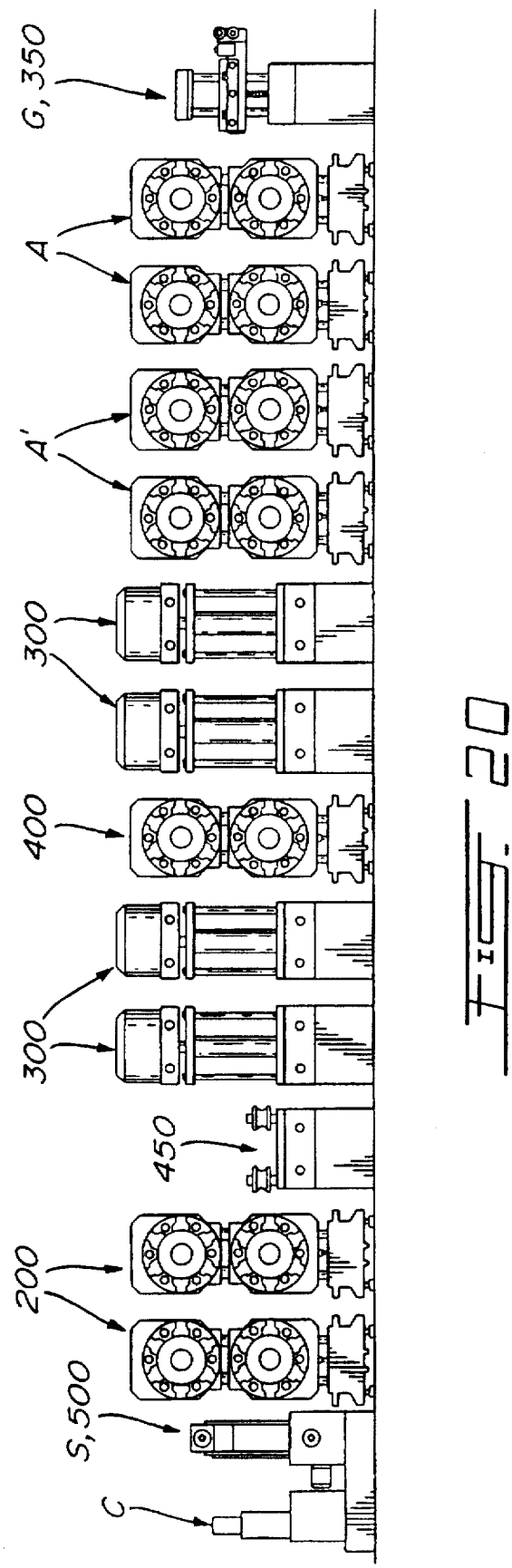

QUICK AUTOMATED TOOL CHANGER ROLL FORMING APPARATUS

This application is a 371 of PCT/CA94/00587, filed Oct. 18, 1994.

BACKGROUND OF THE INVENTION

1. Field of the Invention

The present invention relates to roll forming apparatuses and, more particularly, to an improved quick automated tool changer, or QATC, roll forming apparatus. Soe of the features of the present invention, such as the constant torque motors for driving the rolls, can also be used in tube mills.

2. Description of the Prior Art

In the manufacture of shaped metallic sections, it is well known that whenever a new design, i.e. a new cross-sectional pattern, is to be produced, the operation of the roll forming machine used for manufacturing such shaped metallic sections must come to halt so that the various metal shaping rollers can be dismantled or removed and then replaced by others which define the new desired design. This operation will cause the machine to be out of use for a period which may in some instances extend to three or four days. In addition to being cumbersome and time consuming, the loss of production time resulting from the change over is obviously very costly due to the lack of production during that period.

In the field of metal shaping, the prior art would not seem to suggest an easy way to change over from one set of rolls to another when a new design of shaped metallic sections is required to be produced by the roll forming apparatus. U.S. Pat. No. 3,306,197 issued in February 1967 to Jensen et al. relates to alternative print drums for applying indicia to one surface of a moving sheet or web. These drums are alternatively usable by rotating a common shaft carrying them. U.S. Pat. No. 1,443,164 issued in January 1923 to Bracken on the other hand describes a plurality of marking wheels enabling wheel changes to suit pieces that are to be marked. Other references of interest include U.S. Pat. Nos. 3,400,657 issued in September 1968 to Fulks, 3,730,080 issued in May 1973 to Deligt, 4,286,451 issued September 1981 to Chang, and 4,776,194 issued in October 1988 also to Chang.

Furthermore, some improvements to the technique of roll changing were described in U.S. Pat. No. 4,974,435 issued on Dec. 4, 1990 to Vandenbroucke, wherein there was disclosed a novel roll forming apparatus including a plurality of metal shaping rollers adapted to produce various pre-selected designs and adapted to be rapidly changed over to vary the designs of the metallic shaped sections being produced by the roll forming apparatus. The present invention can be considered as an improvement over Applicant's aforementioned U.S. Patent.

In the production of shaped metallic sections by way of roll forming machines, it is well known to use several forming stations disposed successively one after the other and adapted in such a way that there is a stretching of the metallic sheet being formed from one forming station to the next. To achieve this stretching of the metallic sheets, conventional roll forming apparatuses use forming rolls which get larger at each station, whereby with all rolls rotating at a same angular speed the tangential speed increases from forming stations having rolls of smaller diameter towards forming stations having rolls of larger diameter thereby resulting in a stretching of the metallic sheet. This conventional design of forming stations can result in very large rolls at the last few stations of the roll forming assembly thereby resulting in stations which are cumbersome, costly and which cannot be positioned close to one another.

Furthermore, in view of the forming shapes of the facing rollers of two opposite turrets, the driving engagement of the two forming rollers with the metallic sheet located therebetween is not necessarily centered with respect to the axes of both rollers, whereby the rolls in a same forming station might have to rotate at different angular speeds so that substantially identical tangential speeds are obtained for both forming rollers at the engagement area of the metallic sheet with these forming rollers.

SUMMARY OF THE INVENTION

It is therefore an aim of the present invention to provide an improved roll forming apparatus for use in the manufacture of shaped metallic sections by feeding metal strips between mated pairs of cooperating complementary shaping rollers.

It is also an aim of the present invention to provide a roll forming apparatus wherein each operational forming roll of each forming station is independently driven by a constant torque-type motor.

It is a further aim of the present invention to provide a roll forming apparatus wherein the various forming rolls thereof are easily removable from their respective turret, and wherein the non operational rolls of each turret can be replaced with other rolls, for instance of different design pattern, even while the forming station carrying the turret is operating.

It is a still further aim of the present invention to provide a roll forming apparatus comprising a novel indexing system for the positioning the selected complementary forming rolls of the two turrets of a same forming station, the indexing system including a rack-and-pinion-type mechanism.

It is a still further aim of the present invention to provide a roll forming apparatus comprising a novel gearbox linking each constant-torque motor to a respective one of the forming rolls which are in operational roll forming position, the gearbox enabling for a large range of operating speeds thereby providing flexibility in forming various shaped sections and various materials.

Therefore, in accordance with the present invention, there is provided an apparatus for use in roll forming devices or in tube mills, comprising at least one pair of cooperating rollers adapted to receive therebetween elongated metallic members and to cause the metallic members to displace in translation therethrough when said rollers are rotated, said cooperating rollers being rotatably driven by constant torque motor means in such a way that said rollers cause an elongated metallic member to gradually displace therebetween in a longitudinal way and through said apparatus.

Also in accordance with the present invention, there is provided an apparatus for manufacturing shaped metallic sections by feeding metal strips between mated pairs of cooperating shaping rollers, comprising a first turret head carrying at least two first shaping rollers, a second turret head opposite said first turret head and carrying at least two second shaping rollers, said turret heads being rotatable in order to mate different sets or corresponding first and second shaping rollers for possibly producing at least two different patterns to the metal strips, said sets in a roll forming position being driven by constant torque motor means for feeding the strips therebetween.

More particularly, the roll forming apparatus comprises a pair of rotatable devices each holding a plurality of metal shaping and/or cutting rollers, the rollers of one device meshing with rollers of the other device to produce specific designs or widths of material. This is made possible by merely selecting suitable rollers of both sets and when production of a specific metallic section of desired widths is terminated, other rollers are selected by rotating the rotatable devices. When suitable rollers have been selected they are locked in operating position and when other designs or widths are required, the devices are unlocked, a selection is made, and the devices are again locked to produce the new metallic section or widths of material. The present quick automated tool changer roll forming apparatus is characterized by a novel indexing system for the two forming rolls to be used in a roll forming operation; by the use of constant torque-type motors, such as Brushless motors, for individually driving the shafts carrying the forming rolls in use; by quick-changing supports which carry the rolls for allowing the rolls which are not in use to be changed during a roll forming operation; by sensors on the cylinders producing the force on the forming rolls for providing feedback to the operator on changes in this force; and by a pair of gears selectively engageable with the gearing mechanism linking each of the Brushless motors to a respective forming roll in use for providing a larger range of operating speeds of the forming rolls.

The present invention constitutes an important improvement over the roll forming apparatus of Applicant's U.S. Pat. No. 4,974,435 issued on Dec. 4, 1990, although some features of this Patent are retained herein.

BRIEF DESCRIPTION OF THE DRAWINGS

Having thus generally described the nature of the invention, reference will now be made to the accompanying drawings, showing by way of illustration a preferred embodiment thereof, and in which:

FIG. 2 is a front end elevational view, shown partly in cross-section and fragmented, of a roll forming apparatus in accordance with the present invention;

FIG. 3 is a right side elevational view, partly in cross-section, of the roll forming apparatus of FIG. 2;

FIG. 4 is a cross-sectional side view taken along line 4—4 of FIG. 2 showing the pair turrets and the forming rolls carried thereby;

FIG. 6 is an enlarged detailed vertical transversal cross-sectional view of the right-hand part of the upper turret of FIG. 2;

FIG. 7 is an enlarged detailed elevational view of the indexing mechanism of the lower turret of the roll forming apparatus of FIG. 2;

FIG. 8 is a cross-sectional side view taken along line 8—8 of FIG. 7;

FIG. 9 is an enlarged detailed vertical transversal cross-sectional view of a quick coupling mechanism used for connecting the motor and the gearbox, which are best seen in FIG. 5, to the operational forming roll of the turret;

FIG. 11 is a side elevational view of a further indexing mechanism in accordance with the present invention;

FIG. 12 is a front elevational view of a further roll forming apparatus in accordance with the present invention, wherein the turrets are vertically mounted;

FIG. 13 is a front elevational view of a QATC entry table with automatic gauging system (AGS) in accordance with the present invention;

FIG. 14 is a cross-sectional side elevational view taken along line 14—14 of FIG. 13;

FIG. 15 is a front elevational view partly in cross-section of a further roll forming apparatus in accordance with the present invention;

FIG. 16 is a right side cross-sectional elevational view taken along line 16—16 of FIG. 15;

FIG. 20 is a side elevational view of a basic roll forming line in accordance with the present invention.

DESCRIPTION OF THE PREFERRED EMBODIMENTS

Figure 1:
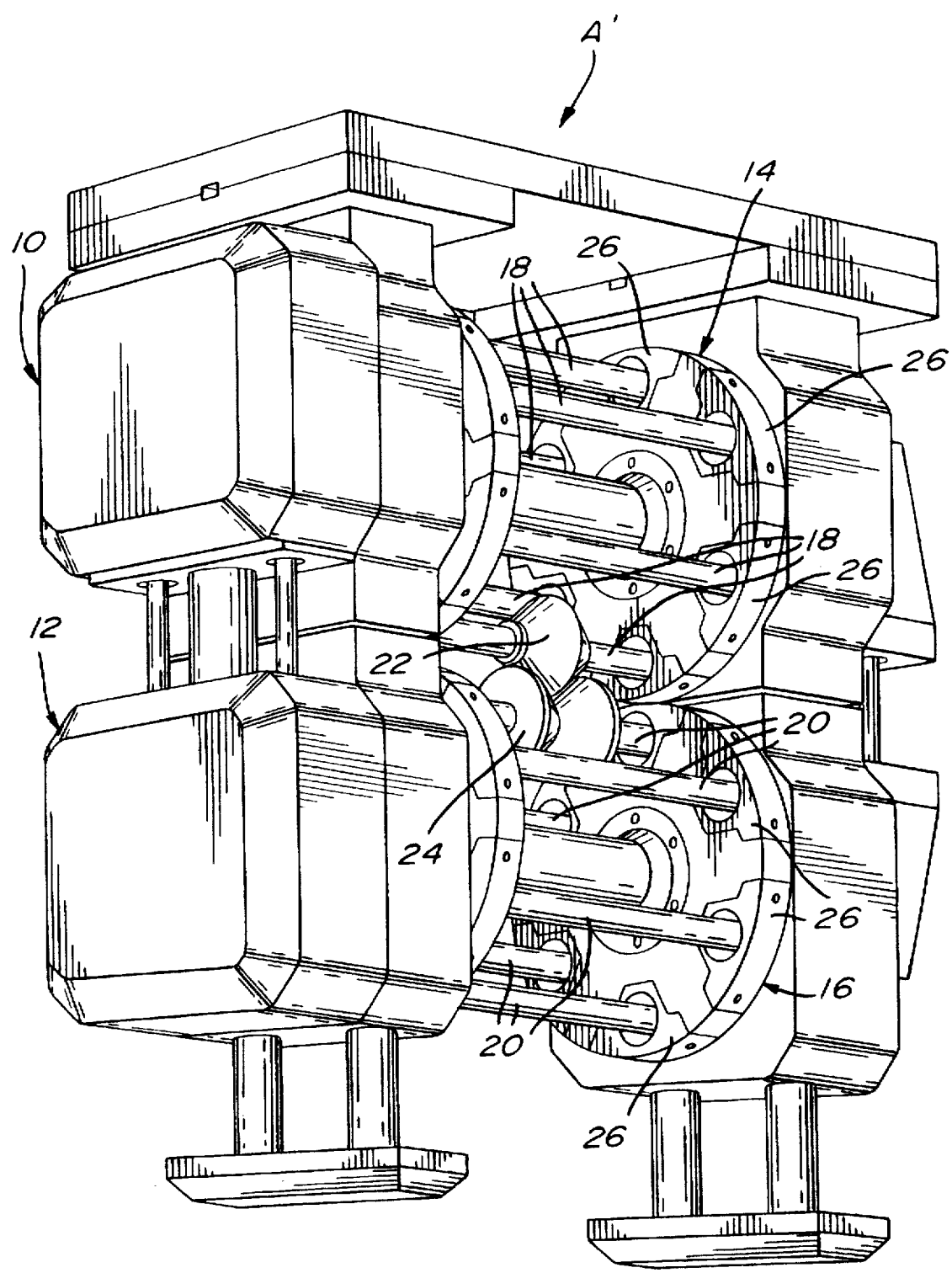
FIG. 1 is a perspective view of a general roll forming apparatus, showing one forming station only.

In accordance with the present invention, there is shown in FIG. 1 a general perspective view of a roll forming apparatus A' in accordance with the present invention, this roll forming apparatus A' corresponding to a single forming station of a basic QATC rollforming line which typically consists, as seen in FIG. 20, of a series of horizontally spaced roll stands or roll forming apparatuses A' (or apparatuses A as shown in FIGS. 2 to 9), of an entry table and automatic gauging system (or AGS) G and of a corrective straightener S which are located before the roll stands A', and finally of a feedback profile corrector (or FPC) C which is also not shown and which is located after the roll stands A'.

The roll forming apparatus A' comprises basically upper and lower frames 10 and 12, respectively, which can displace vertically relative to each other, and upper and lower turrets 14 and 16 respectively rotatably mounted to the upper and lower frames 10 and 12 in a vertically spaced and parallel relationship. The turrets 14 and 16 each support the same number of parallel, rotatably mounted shafts or spindles 18 and 20, respectively, with six (6) such shafts 18 and 20 being herein shown for each of the turrets 14 and 16. The shafts 18 of the upper turret 14 carry six differently shaped forming and/or cutting rollers 22 (only one such roller 22 being shown in FIG. 1, i.e. on the lowermost shaft 18) adapted to mate in pairs with six complementarily shaped forming and/or cutting rollers 24 (only one such roller 24 being shown in FIG. 1, i.e. on the uppermost shaft 20), whereby the apparatus A' can produce any one of six specific designs on metallic sheets or strips fed through the turrets 14 and 16. This is made possible by merely selecting a suitable roller 18 and 20 from each turret 14 and 16 and when production of a specific metallic section of specific width or cross-sectional pattern is terminated, other rollers can be selected by rotating the rotatable turrets 14 and 16.

When suitable rollers 18,20 have been selected they are locked in operating position and when another design or width is required, the turrets 14,16 are unlocked, a selection amongst the forming rollers 18,20 is made, and the turrets 14,16 are again locked to produce the new metallic section or widths of material.

Removable mountings 26 are provided on the turrets 14 and 16 for easy removal of any individual shaft 18 or 20 thereby allowing for the removal of any of the shafts 18 and 20 which are not in roll forming position even while the apparatus A' is operating. Indexing mechanisms bring a selected pair of complementary rollers 18 and 20 of both turrets 14 and 16 into the forming position. Each of the two shafts 18 and 20 which are in the forming position are individually and independently powered by a variable speed motor, of the constant torque-type, which transmits torque to the shafts 18 and 20 by means of a multiple speed gearbox and a coupling mechanism, with the motor, gearbox and coupling mechanism being described in detail hereinbelow. The coupling mechanisms are engaged/disengaged by means of cylinders or other actuating means which move the turrets simultaneously back and forth along their central longitudinal axes. A cylinder or other actuating means mounted on each side of the forming stand supplies the force on the pair of forming rolls required for forming. Either one or both of the turrets 14 and 16 may have such an actuator. Loadcells are provided for feedback in controlling the force produced by the cylinders supplying the force between the two operative shafts 18 and 20.

FIG. 2 illustrates a more detailed roll forming apparatus A also in accordance with the present invention and which is overall similar to the roll forming apparatus A' of FIG. 1, with FIGS. 3 to 9 representing various detailed views of the apparatus A of FIG. 2.

Generally, the basic QATC rollforming machine consists of a series of horizontally spaced roll stands, such as the apparatus A of FIG. 2, each comprising upper and lower frames 30 and 32 and each supporting a pair of vertically spaced, parallel, and rotatably mounted upper and lower turrets 34 and 36, respectively, mounted respectively to the upper and lower frames 30 and 32. More particularly, the upper frame 30 includes a pair of horizontally spaced apart upper frame sections 30a and 30b with the upper turret 34 being rotatably mounted therebetween. Similarly, the lower frame 32 includes a pair of horizontally spaced apart lower frame sections 32a and 32b with the lower turret 36 being rotatably mounted therebetween. The turrets 34 and 36 each support a same number of parallel and horizontal shafts or spindles 38 and 40, respectively, which are rotatably mounted thereto. The number of shafts 38 and 40 which may be mounted on each turret 34 and 36 is dependent on the tooling requirements of the user. In FIG. 2, there is shown six (6) such shafts 38 or 40 for each of the upper and lower turrets 36 and 38, as one possible example. The shafts 38 of the upper turret 34 carry six differently shaped forming and/or cutting rolls or rollers 42 (only two such rollers 42 being shown in FIG. 2, i.e. on the uppermost and lowermost ones of the shafts 38) adapted to mate or to mesh in pairs with six complementarily shaped forming and/or cutting rolls or rollers 44 (only two such rollers 44 being shown in FIG. 2, i.e. on the uppermost and lowermost ones of the shafts 40), whereby the apparatus A can produce any one of six specific designs on metallic sheets or strips fed through the turrets 34 and 36. This is made possible by merely selecting a pair of suitable complimentary rollers 42 and 44 from the turrets 34 and 36 and when production of a specific metallic section of specific width or cross-sectional pattern is terminated, other rollers can be selected by rotating the rotatable turrets 34 and 36. When suitable rollers 42,44 have been selected, they are locked in operating position and when another design or width is required, the turrets 34,36 are unlocked, a selection amongst the forming rollers 42,44 is made, and the turrets 34,36 are again locked to produce the new metallic section or widths of material.

Removable mountings 46 are provided on the turrets 34 and 36 for easy removal of any individual shaft 38 or 40 thereby allowing for the removal of any of the shafts 38 and 40 which are not in roll forming position even while the apparatus A is operating. This further allows for the turrets 34 and 36 to be adapted with other shaping patterns by attaching to the turrets 34,36 new shafts 38,40 carrying differently shaped rollers.

An indexing mechanism 48, such as the ratchet or rack-and-pinion device shown, is provided for each of the turrets 34 and 36 to bring a pair of rollers 42,44 of both turrets 34 and 36 into the forming position.

Each of the two shafts 38 and 40 which are in the roll forming position, that is the lowermost shaft 38 of the upper turret 34 and the uppermost shaft 40 of the lower turret 36, are individually and independently powered by a variable speed motor 50, similar for each of the turrets 34 and 36, which transmits torque to the shafts 38 and 40 which are in roll forming position by means of a multiple speed gearbox 52 and a coupling mechanism 54. The coupling mechanisms 54 are each engaged/disengaged by means of a cylinder or other actuating means 56 which displace simultaneously the turrets 34 and 36 horizontally back and forth along their respective central longitudinal axes.

A cylinder or other actuating means 58 mounted on a concrete base 60 and on each side of the forming stand, that is under each of the lower frame sections 32a and 32b, is adapted to vertically displace the frame sections 32a and 32b of the lower frame 32 and thus the turret 36 carried thereby relative to the upper frame 30 and upper turret 34 in a such a way as to supply the force on the pair of forming rolls 42,44 in rollforming position which is required for forming. Either one or both of the turrets 34 and 36 may have such an actuator 58. Loadcells 62 are provided under the lower frame sections 32a and 32b for feedback in controlling the force produced by the cylinders 58 supplying the force between the two operative shafts 38 and 40.

Regarding the indexing of the upper and lower turrets 34 and 36, a corresponding pair of forming rolls 42 and 44 are brought into the rollforming position thereof typically as per the following sequence:

1. Both cylinders 56 simultaneously displace in a horizontal direction the upper and lower turrets 34 and 36 along their respective longitudinal axes thereby disengaging the coupling mechanisms 54, that is mechanically disconnecting the rollers 42 and 44 from the upper and lower frame sections 30a and 32a for allowing the turrets 34 and 36 to be rotated independently of the frames 30 and 32;

2. The rack-and-pinion indexing mechanisms 48 then rotate the upper and lower turrets 34 and 36 about their respective longitudinal axes by a given angle so that the desired pair of complementary forming rolls 42,44 having a pre-selected pattern are brought into the rollforming position, i.e. are positioned opposite each other and in mating engagement;

3. The cylinders 56 simultaneously move the turrets 34 and 36 along their longitudinal axes in a direction opposite that of above step 1, thereby causing the selected forming rollers 42 and 44 to become engaged with the coupling mechanisms 54 and thus with the motors 50 by way of the gearboxes 52 which again mechanically link the coupling mechanisms 54 to the motors 50;

4. The cylinders 58 raise the lower frame sections 32a and 32b of the lower frame 32 and thus the lower turret 36 towards the upper frame 30 and its upper turret 34 so as to bring together the lowermost forming roll 42 of the upper turret 34 and the uppermost forming roll 44 of the lower turret 36 into the rollforming position thereof; and 5. The motors 50 and the gearboxes 52 are then set at the appropriate speed thereby causing the meshing rollers 42 and 44 to rotate as the motors 50 drive the gearboxes 52 which, by way of the coupling mechanisms 54, rotatably drive the shafts 38 and 40 carrying these meshing or operational rollers.

The shafts or spindles 38 and 40 are each journaled at opposite longitudinal ends thereof in a pair of bearing blocks 64 and each assembly of a shaft 38 and 40 and its respective bearing blocks 64 are removably mounted to the turrets 34,36 with the quick change system or mountings 46, as best seen in FIG. 4, whereby shafts 38,40, bearings and bearing blocks 64 may be quickly removed from the turrets 34 and 36. This allows for rapid changing of the shafts 38,40 for maintenance and setup purposes of the machine A without incurring long downtimes. New shafts carrying shaping rollers defining new patterns can also be added to the turrets 34,36, whereby the turrets 34 and 36 of the present drawings are not solely limited to six shaping or cutting patterns. Bolts 66 are used to connect the quick change mountings 46 to the turrets 34 and 36, and these bolts 66 can be simply removed to allow any shaft 38,40 and roller 42,44 carried thereby which are not in the rollforming position thereof to be removed and replaced without interrupting the rollforming operations.

Figure 5:
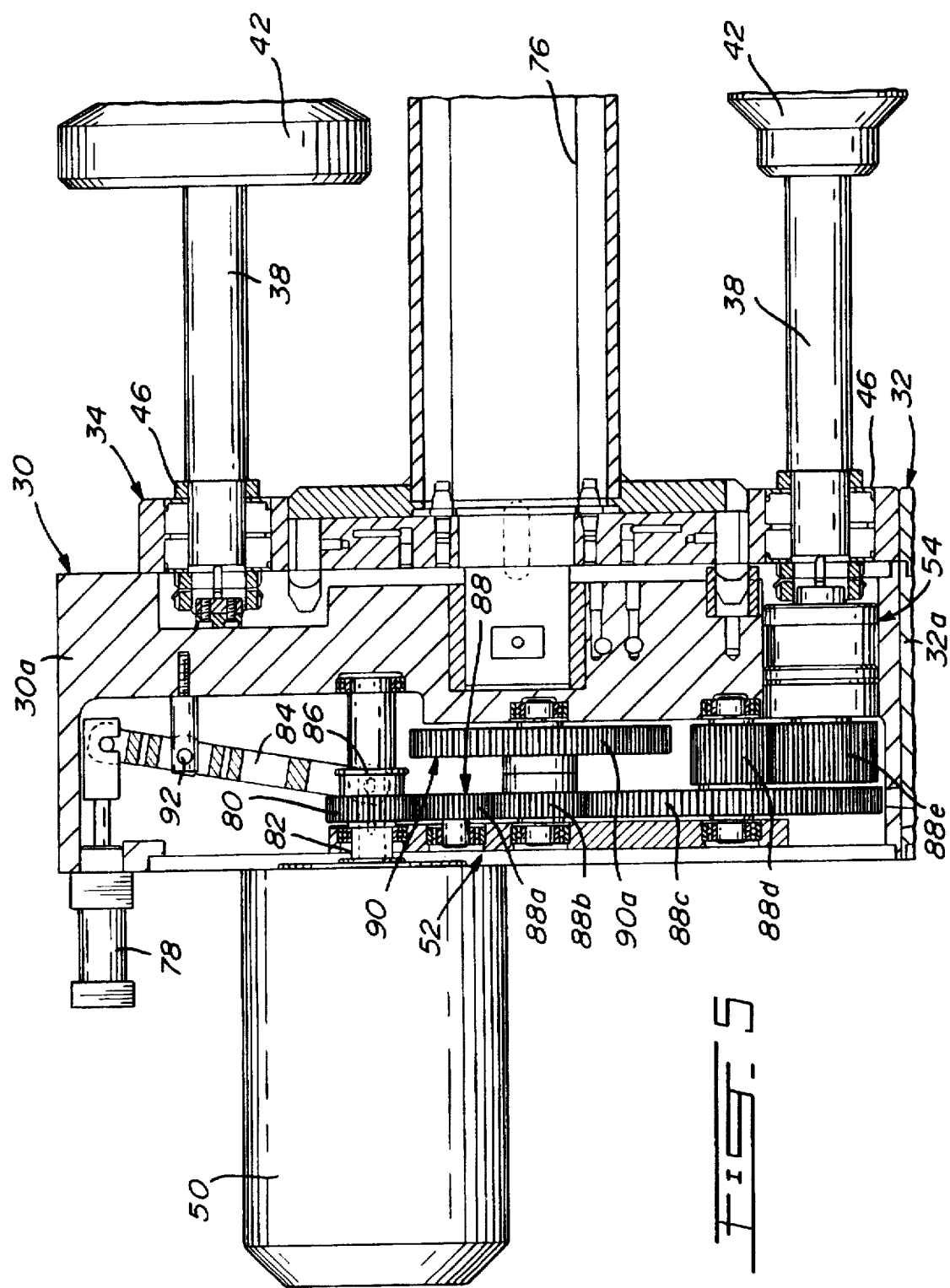
FIG. 5 is an enlarged detailed vertical transversal cross-sectional view of the left-hand part of the upper turret and frame of FIG. 2.

Now referring to FIGS. 2 and 3 and especially to FIGS. 7 and 8, the indexing mechanism 48 comprises a rack-and-pinion system for rotating the turret 34 and 36 in 60° increments as there are six shafts 38,40 on each of the turrets 34 and 36 in the embodiment illustrated herein. Indeed, for each indexing mechanism 48, there are provided a rack 68 and a pinion 70 selectively engageable therewith, wherein each rack 68 longitudinally is mounted to the piston end, of a cylinder 74 secured to the frame sections 30b and 32b, whereas each pinion 70 is transversely and coaxially mounted at the end of a main central shaft 76 of the turret 34,36 with a piston 72 of a respective cylinder 56 being adapted to longitudinally displace the central shaft 76 and thus the turret 34,36 and the pinion 70 along a common axis thereof. For instance, in the extended position of the cylinders 56 shown in FIGS. 2 and 7, the pinions 70 are located inwardly of the racks 68 and are thus not engaged therewith, whereby the turrets 34 and 36 cannot be rotated; in this extended position of the cylinders 56, it is noted that the rollers 42,44 in the rollforming position are engaged to the coupling mechanisms 54 and can be driven by the motors 50, as seen in FIGS. 2 and 5. When the cylinders 56 are retracted, the racks 68 mesh the pinions 70, whereby an actuation of the cylinders 74 will cause the racks 68 to displace in translation thereby causing a rotation of the pinions 70 and thus of the turrets 34 and 36. Both cylinders 74 can be automated so that they are actuated simultaneously and in such a way as to ensure that complementary rollers 42 and 44 become positioned at the rollforming position between the turrets 34 and 36, and so that the racks 68 translationally displace in increments corresponding to 60° rotations in the present case where there are six (6) shafts 38,40 per turret 34,36 thereby reducing adjustments in the facing position of the shafts 38,40 carrying the rollers 42,44 which are to mate together in the rollforming position thereof.

Therefore, when the cylinders 56 are retracted, the motors 50 cannot attempt to drive the rollers 42,44 as the latter are not engaged with the coupling mechanisms 54, whereas the cylinders 74 can be actuated to rotate the turrets 34 and 36 and all six shafts 38 and 40 carried by each. On the other hand, when the cylinders 56 are extended, the displacement of the racks 68 resulting from a possible actuation of the cylinders 74 has no effect on the pinions 70 and thus the turrets 34 and 36 do not rotate, whereas the rollers 42 and 44 are engaged with the coupling mechanisms 54 and can thus be rotatably driven by the motors 50 in rollforming operations.

As best seen in FIG. 5, the gearboxes 52 offer two ranges of operating speeds in view of a cylinder 78 which is provided on each gearbox 52 and which is connected by way of a linkage 84 (pivotally mounted at 92) to a sleeve 86 which is slidable on a drive shaft 82 of the motor 50 and which carries a drive gear 80 in such a way that rotation of the motor shaft 82 will cause the drive gear 80 to rotate without causing any rotation of the sleeve 86. This can be accomplished, for instance, if the sleeve 86 embodies a bearing, or the like, which includes an outer section connected to the linkage 84 (and adapted only for translational displacements along the motor shaft 82) and an inner section rotatably connected to the outer section and fixedly connected to the drive gear 80 for rotation therewith. Therefore, the cylinder 78 can be actuated to displace in translation the sleeve 86 and thus the drive gear 80 so that the latter is selectively positioned to mesh with the appropriate one of the two gear trains 88 and 90 which will provide each of the shafts 38 and 40 in rollforming position with a desired angular speed. In the position shown in FIG. 5, the drive gear 80 meshes with gear 88a which meshes with gear 88b which in turn meshes with gear 88c which is mounted on a same shaft as gear 88d, the latter meshing with gear 88e which is adapted to drive the roller 42,44 by way of the coupling mechanism 54. If the cylinder 78 is retracted, the sleeve 86 is displaced to the right by the linkage 84 thereby causing the drive gear 80 to mesh with gear 90a which is mounted on a same shaft as gear 88b, whereby gear 90a causes the gear 88b to rotate which in turn causes the gears 88c, 88d and 88e to rotate. Therefore, in gear train 90, the drive gear 80 meshes with a gear 90a which is larger than the gear 88a of the gear train 88, whereby the gear 88b will rotate more quickly when meshing with gear 88a than when meshing with gear 90a. Thus, for a same motor speed, the gear train 88 will cause the roller 42,44 to rotate more rapidly than when driven by the gear train 90. The gearboxes 52 are shown incorporated into the structure or the frame sections 30a and 32a of the apparatus A.

It is also contemplated to have the drive gear 80 selectively engage a gear train linked to the central shaft 76 of the turret 34,36, whereby the motor 50 could be used to rotate the turrets for the indexing thereof, instead of the rack-and-pinion indexing mechanism 54 described hereinabove. Such a variant of the indexing mechanism is described in details hereinafter.

In general and with reference to FIG. 9, each coupling mechanism 54 includes a shaft receiving key 94 which is spring-loaded with a spring 98 for maintaining the shaft 38,40 (which carries a roller 42,44 which is in rollforming position) secured to the turret 34,36 and so that the gear 88e which is fixedly secured to a rotatable member 96 carrying the spring-loaded key 94 can cause the rotation of the member 96, of the key 94 and thus of the shaft 38,40 engaged with the key 94. Therefore, when the cylinders 56 are extended, the shafts 38 and 40 carrying the meshed rollers 42 and 44 are engaged to the keys 94 of respective coupling mechanisms 54, whereby a rotation of the motors 50 will cause the rotation of the drive gear 80 of each frame section 30a,32a and of one of the two gear trains 88 and 90 in meshed engagement therewith which in turn will cause the rotation of the member 96 and of the key 94 of the coupling mechanism 54 of each frame section 30a,32a and thus of the shafts 38 and 40 keyed thereto and of the mating rollers 42 and 44 carried by these shafts 38,40.

The variable speed motors 50 are designed to enable a large range of operating forming speeds thereby providing flexibility in forming a wide variety of sections and materials. The speed of the motors 50 at each station or, in the present description, at each roll forming apparatus A is controlled in such a way as to provide a slightly increasing torque to the forming rolls 42,44 of successive stations/apparatuses A and, if necessary, to provide more or less torque to the forming rolls 42,44 at any given station. The motors 50 are of the constant torque type, such as AC or DC Brushless motors, wherein the output of the motors 50 is a constant torque instead of a constant angular speed. Each motor 50 can be independently programmed, whereby the torque exerted by each roller 42,44 of each station or apparatus A can be controlled in view of various parameters so as to obtain a desired pattern on the metallic sheet or strip fed through the apparatus A. Indeed, such Brushless motors 50 exerting constant torque are mounted as shown to provide for a self compensation of errors because of sophisticated control systems inherent to these motors. The use of such constant torque motors 50 allows for all of the rollers 42 and 44 of all of the stations/apparatuses A to be of a same size as the angular speed thereof can be easily adjusted at each station with the electronically operated Brushless motors 50, whereby proper angular and tangential speeds can be obtained at each operational forming roll 42,44 depending on the stretching required and on the location of the driving engagement area with respect to the axes of the operational forming rollers 42 and 44. It is noted that such constant torque motors 50 can also be used to pull metal in tube mills for the production of tubes or pipes.

The sensors 62 will provide feedback to the operator in the cases where the pressure between the forming rolls 42 and 44 fluctuates as this might change the configuration, such as the thickness, of the metallic section produced by the apparatus A. The operator can thus verify that everything is in order or make the proper modifications to ensure appropriate further metallic sections before a lengthy defective section is produced.

Figure 10:
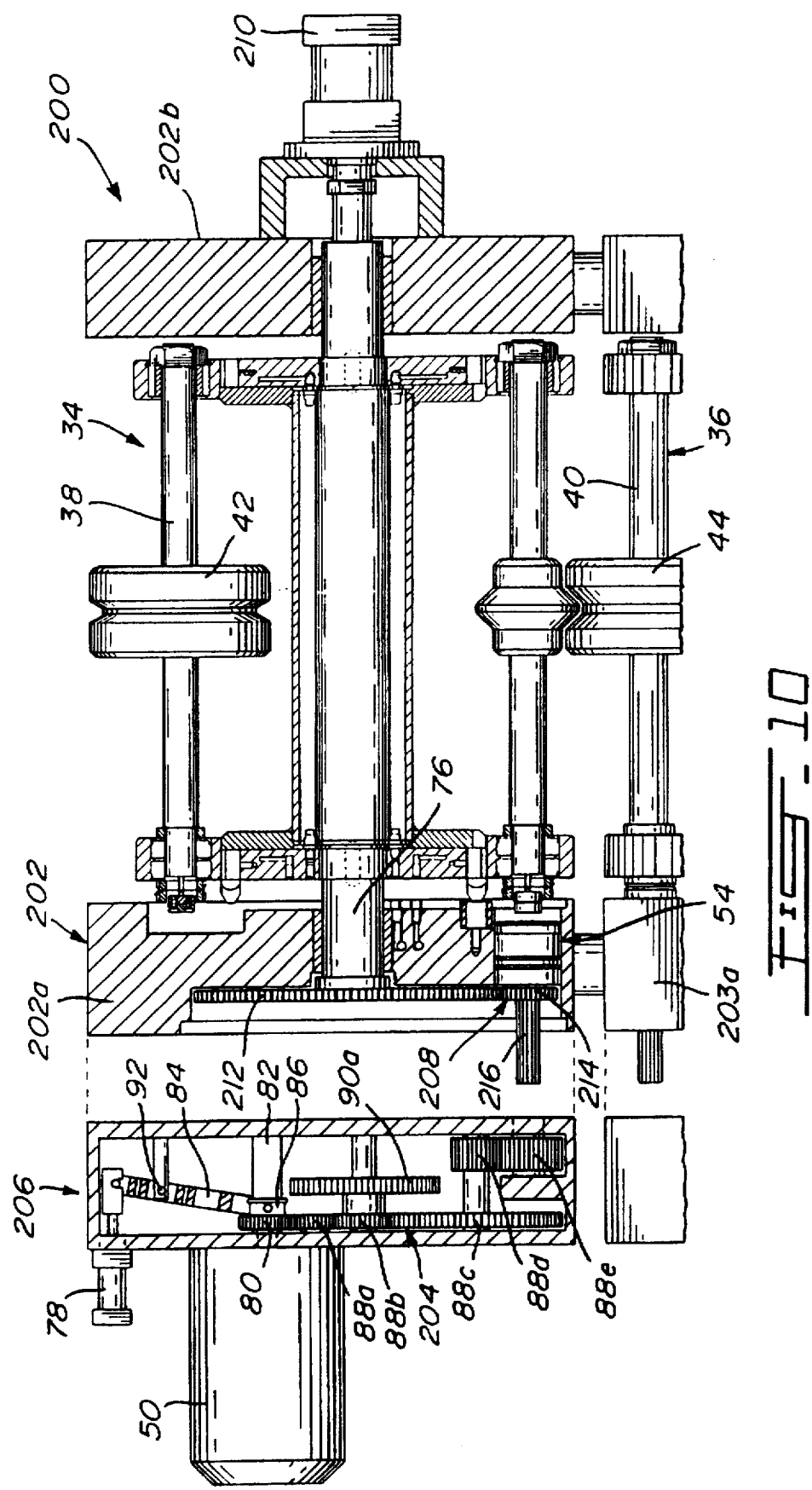
FIG. 10 is a detailed vertical transversal cross-sectional frontal view, and partly exploded, of the upper part, i.e. of the upper turret and upper frame, of a variant in accordance with the present invention of the roll forming apparatus of FIG. 2 and, more particularly, of modified indexing mechanism and gearbox therefor.

FIG. 10 illustrates an upper part of another embodiment of a QATC roll stand or apparatus 200 and, more particularly, an upper frame 202 including frame sections 202a and 202b between which is provided substantially the upper turret 34 of FIG. 2 and the upper shafts 38 and rollers 42 associated therewith. In the apparatus 200, two identical (but in a mirror image) reduction gearboxes 204 of both the upper frame 202 and lower frame (not shown) and associated drive motors 50 are mounted in removable units 206 which can be removably mounted to the upper and lower frame sections 202a and 203a of the upper and lower frames 202 and 203. Each gearbox 204 can be a two-speed reduction unit as shown in FIG. 10, the gearbox 204 being removable but otherwise being very similar to the gearbox 52 of FIG. 5. But it is also understood that any type of power transmission may be utilized, including the drive system of conventional universal-type rollformers. This embodiment 200 also includes means different than the indexing mechanism 48 of the apparatus A as shown in FIGS. 2, 3, 7 and 8 and used to index the turrets 34 and 36 thereof. More particularly, a power take-off from the spindle drive, in the form of a gear train 208, is used to index each turret 34,36. A cylinder 210 causes the axial displacement of the turret 34,36 (in a way similar to that described in apparatus A) in such a way as to engage/disengage the power take-off 208 so that the turret 34,36 can be indexed. When the cylinder 210 is retracted (see FIG. 10), a central gear 212 secured to the end of the central shaft 76 of the turret 34,36 meshes with a gear 214 fixedly secured to the coupling mechanism 54, whereby a rotation of the motor 50 causes by way of the gearbox 204 a rotation of spline shaft 216 and thus of the gears 212 and 214 of the gear train 208 and ultimately of the turret 34,36, and it is noted that in the retracted position of the cylinder 210 no shaft 38,40 is engaged in the coupling mechanism 54 whereby the rotation of the rotatable member 96 of the coupling mechanism 54 due to the rotation of the spline shaft 216 has no consequence. When the cylinder 210 is extended, the gears 208 and 212 do not mesh whereas shafts 38,40 are engaged to the coupling mechanisms 54, whereby the motors 50 will cause the rotation of such shafts 38,40 but not of the central gear 212 and thus not of the turret 34,36.

FIG. 11 shows another embodiment of a turret indexing mechanism 250, wherein a motor 252 drives a chain or belt 254, or the like, which engages pulleys 256 (or the like) connected to both the upper and lower turrets to index the same simultaneously. It is understood that means other than an electric motor may be used for this purpose, including a hand crank, a hydraulic or pneumatic motor or a rotary actuator, or any other suitable such means. A tensioning device 258 is used to permit relative vertical movement between the turrets while maintaining operational the belt 254 of the turret indexing mechanism 250.

FIG. 12 illustrates another embodiment of a QATC roll stand or apparatus 300, wherein the roll stand 300 supports a pair of vertically mounted (as opposed to horizontally mounted as hereinbefore), horizontally spaced, parallel and rotatably mounted turrets 302. It is understood that, in a basic QATC rollforming line which typically consists of a series of horizontally spaced roll stands, both horizontally and vertically mounted turrets can be incorporated in the same rollforming line and in any appropriate sequence. Cylinders 304 are mounted on both turrets 302 to align the forming rolls 306 thereof with those of previous stands. Reference 308 indicates the shafts or spindles of the turrets 302. It is further understood that other actuating means may be employed for this purpose.

FIGS. 13 and 14 show an embodiment of a QATC entry table with an automatic gauging system (i.e. AGS) 350. Entry rolls 352 guide the incoming material through an AGS 354 which measures the material's thickness across its entire width by means of sensors employing mechanical, electrical or magnetic means. Side rolls 356 mounted on moveable carriages 358 are adjusted by step motors 360 or similar means to align the material with the first roll stand in the rollforming line.

FIGS. 15 and 16 illustrate another embodiment of a QATC roll stand or apparatus 400, wherein the coupling mechanism 402 is mounted on a movable fixture 404. Rather than having the turret move as in FIGS. 2 and 10, an actuator 406 moves the fixture 404 to engage/disengage the drive coupling 402. A step motor 408, or similar means such as a hand crank or ratchet mechanism, engages a gear train 410 to index the turret after the coupling mechanism 402 has been disengaged. In this embodiment, the drive 412 is similar to the drive on a standard universal type rollforming machine, however it is understood that individual motors and gearboxes could be used as described in FIGS. 2 and 10.

Figure 17:
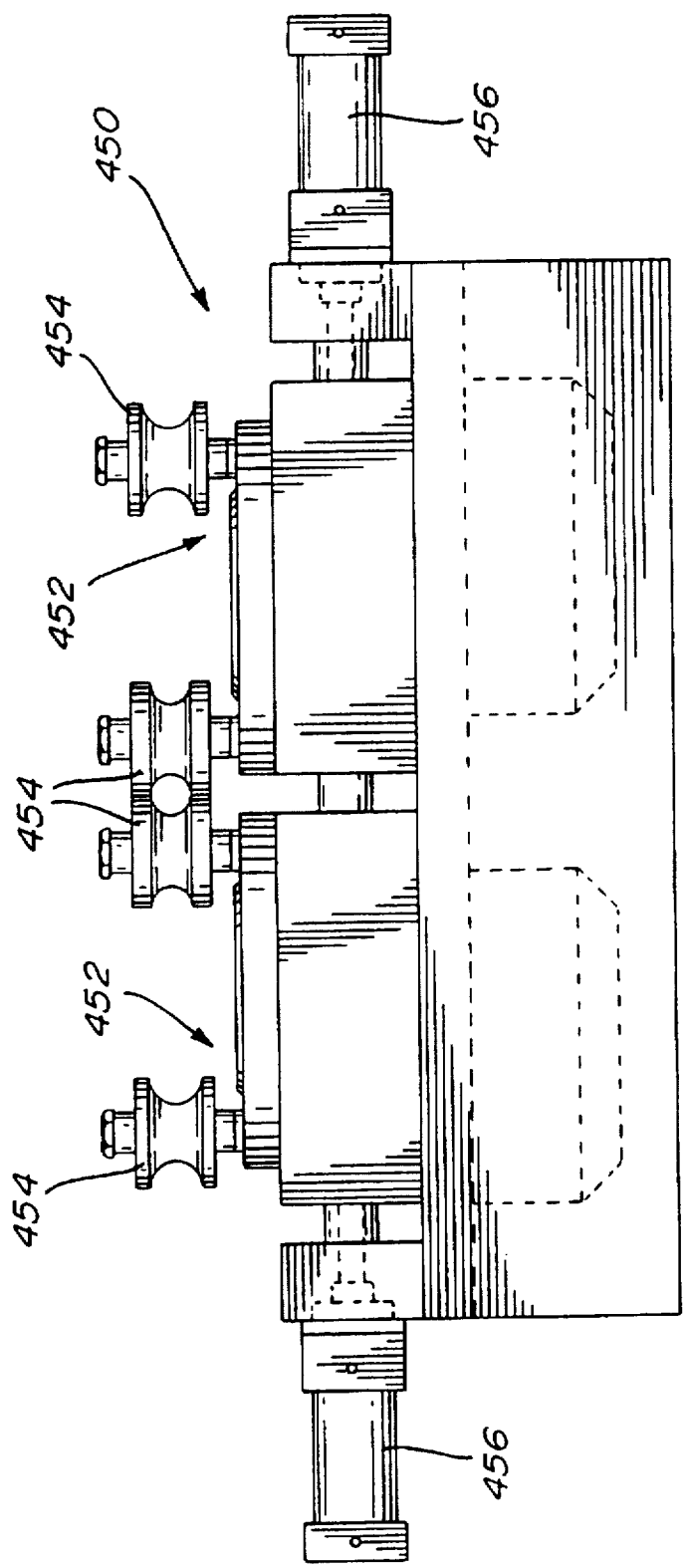
FIG. 17 is a front elevational view of a further roll forming apparatus in accordance with the present invention adapted for narrow metallic sections and wherein the turrets are vertically mounted.

FIG. 17 illustrates an embodiment of a roll stand 450 with vertically mounted turrets 452 supported only at lower ends thereof and thus for use in the shaping and/or cutting of narrow metallic sections or strips, wherein the form rolls 454 are not driven but are idler rolls. As in FIG. 12, actuators such as the hydraulic cylinders 456 herein shown are used to position the idler rolls 454 and supply the force required for forming.

Figure 18B:
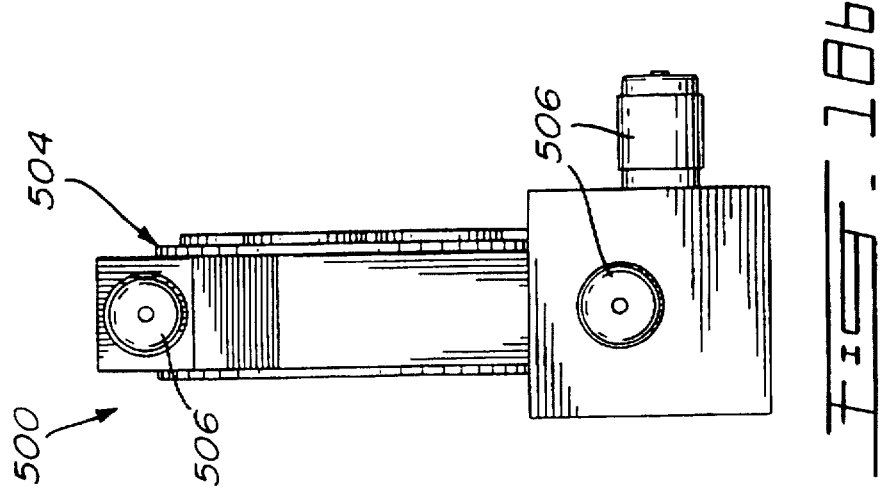
FIGS. 18a and 18b are respectively front and side elevational views of a QATC straightener in accordance with the present invention.
Figure 18A:
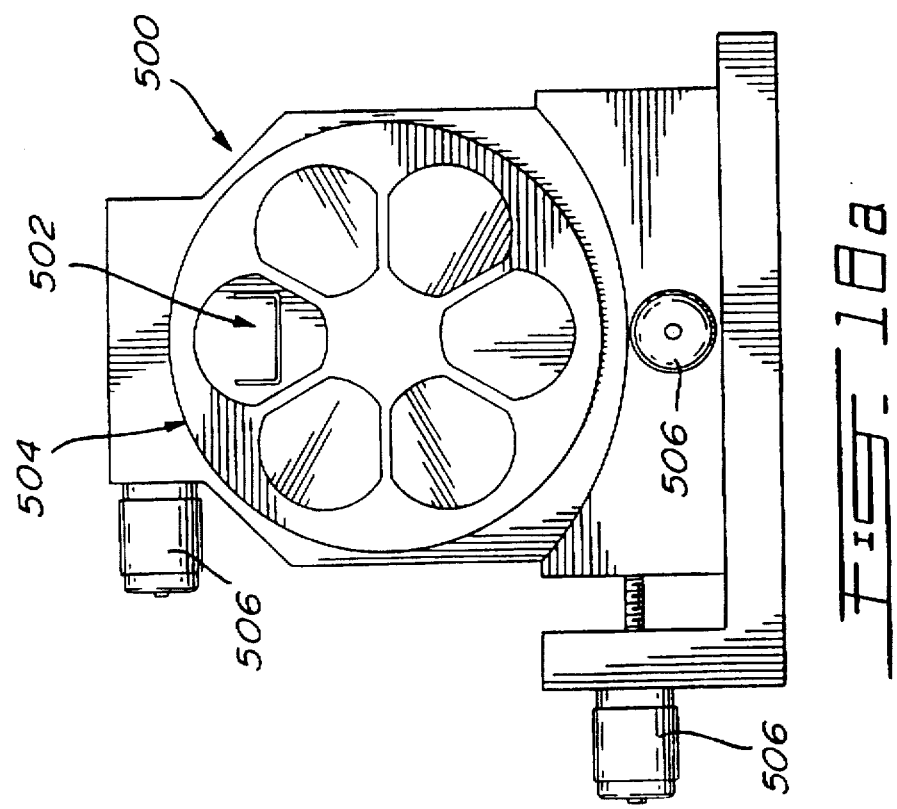

FIGS. 18a and 18b illustrates an embodiment of a QATC straightener 500 with a 3-axis adjustment, although a 5-axis adjustment may be done using similar means. Multiple, removable straightener heads 502 are mounted on a removable, rotatably mounted indexable turret 504. The indexing and adjustment of the straightener heads 502 is accomplished by means of actuators such as step motors herein shown at 506, but it is understood that hand wheels, hydraulic or pneumatic cylinders, or other such means, may be used for this purpose.

Figure 19:
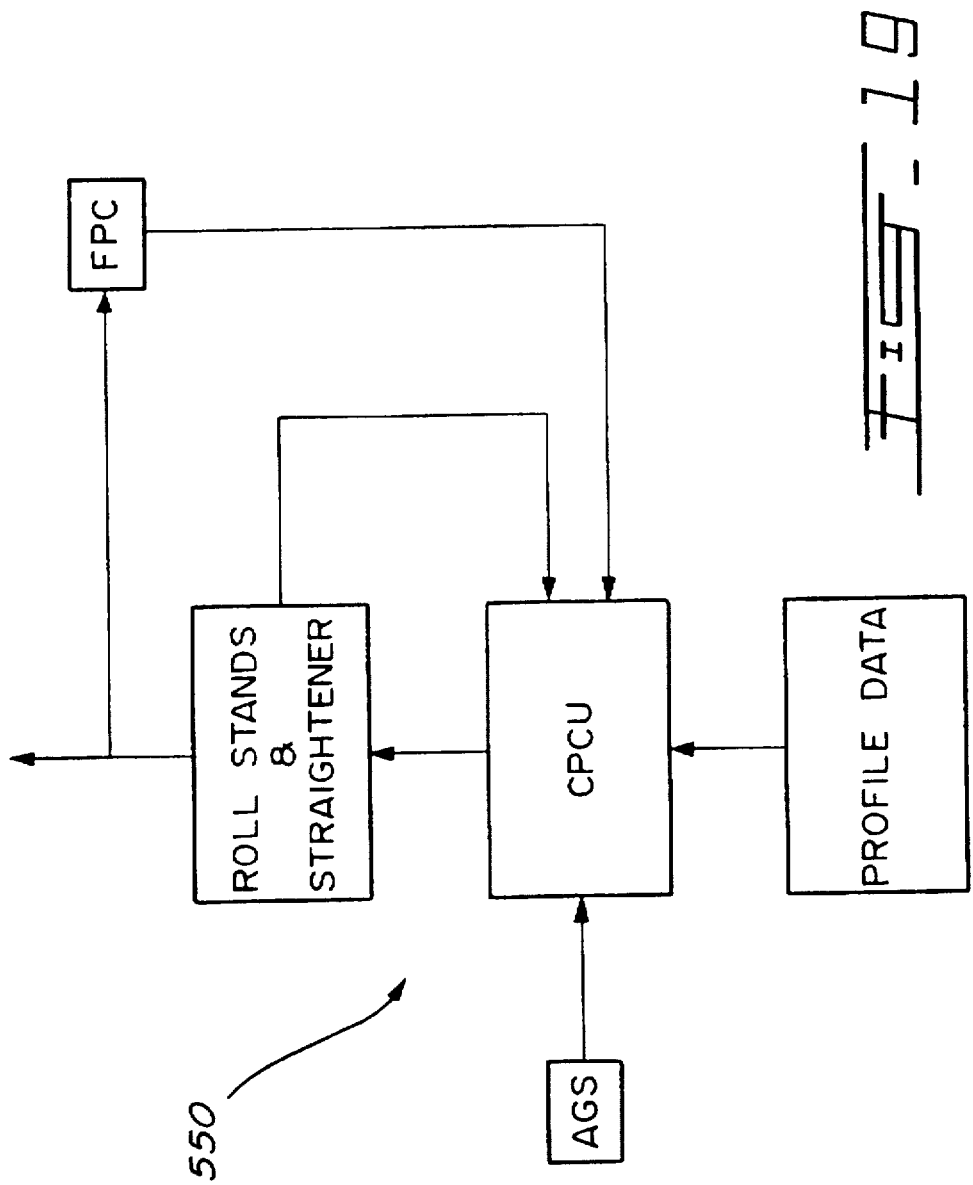
FIG. 19 is a schematic flowchart of a dynamic correction system, or DCS, in accordance with the present invention.

FIG. 19 shows a schematic of the dynamic correction system, i.e. DCS, 550 used to control in real time the dimensional characteristics of the profile being formed. It consists of the FPC (i.e. feedback profile corrector) to measure in real time the deviation from the desired profile dimensions and characteristics; the AGS; a central processing and control unit or CPCU; rollforming stands; and straightener. The FPC and AGS provide input about the profile dimensional characteristics to the CPCU, which analyzes the information and provides output to the individual roll stands and straightener to correct deviations from the desired profile. The input to the CPCU would include information about sheet thickness, profile dimensions, straightness, waviness, internal stress and other information which may be measured with present technology as well as information about the current status of the straightener and roll stands. The output would provide for control of the forces imparted to the forming rolls, the individual motor speeds and torques and the adjustment of the straightener axes.

I claim:

1. An apparatus for use in roll forming devices or in tube mills, comprising at least one pair of cooperating rollers adapted to receive therebetween elongated metallic members and to cause the metallic members to displace in translation therethrough when said rollers are rotated, said cooperating rollers being rotatably driven by constant torque motor means in such a way that said rollers cause an elongated metallic member to gradually displace therebetween in a longitudinal way and through said apparatus, said cooperating rollers forming the elongated metallic member passing therethrough without substantially affecting a thickness of the elongated metallic member.

2. An apparatus for manufacturing shaped metallic sections by feeding metal strips between mated pairs of cooperating shaping and/or cutting rollers, comprising a first turret head carrying at least two first shaping rollers, a second turret head opposite said first turret head and carrying at least two second shaping rollers, said turret heads being rotatable in order to mate different sets of corresponding first and second shaping rollers for selectively producing at least two different patterns to the metal strips, said sets in a roll forming position being driven by constant torque motor means for feeding the strips therebetween, said shaping rollers forming the metal strips passing therethrough without substantially affecting a thickness of the metal strips.

3. An apparatus for manufacturing shaped metallic sections by feeding metal strips between mated pairs of cooperating complementary shaping and/or cutting rollers, comprising a first turret head carrying at least two first shaping rollers, a second turret head opposite said first turret head and carrying at least two second shaping rollers, said turret heads being rotatable in order to mate different sets of corresponding first and second shaping rollers for selectively producing at least two different patterns to the metal strips, said sets in a roll forming position being driven by motor means for feeding the strips therebetween, an indexing device for indexing said turret heads comprising rack-and-pinion means for selectively rotating said turret heads along given angles corresponding to roll forming positions of said sets of complementary rollers, actuating means being provided for bringing rack means and pinion means of said rack-and-pinion means in and out of meshing engagement, wherein when said rack means and said pinion means are not meshing said mated rollers can be rotatably driven by said motor means, whereas when said rack means and said pinion means are engaged said mated rollers cannot be rotatably driven by said motor means and said turret heads can be rotated by said indexing device.

4. An apparatus as defined in claim 3, wherein gearbox means are provided for drivingly linking said motor means selectively to either one of said mated rollers for causing the rotation thereof in a roll forming operation or of said turret heads for the indexing thereof.

5. An apparatus as defined in claim 3, wherein gearbox means offer at least gear train means for selectively allowing said motor means to rotate said mated rollers in said roll forming position within various ranges of operating speeds.

6. An apparatus as defined in claim 3, wherein disengageable coupling means are provided for linking a gearbox means dependent of said motor means and driven thereby to said mated rollers in said roll forming position while allowing said mated rollers to be disengaged from said coupling means when indexing said turret heads.

7. An apparatus as defined in claim 3, wherein vertical cylinder means are provided for selectively displacing said turret heads towards and away from each other for varying a pressure exerted thereby on the metal strip.

8. An apparatus as defined in claim 7, wherein loadcells are provided on said cylinder means for providing feedback on the forces exerted on the metal strips by said mated rolls.

9. An apparatus as defined in claim 3, wherein said rollers and shafts carrying said rollers are removably mounted from said turret heads.

10. An apparatus as defined in claim 6, wherein said gearbox means and said motor means are removably mounted to said apparatus.

11. An apparatus as defined in claim 5, wherein said gearbox means comprise two gear train means for selectively causing a rotation of said mated rollers or of said turret heads, cylinder means being provided for connecting a selected one of said gear train means to said motor means.

* * * * *